United States Patent
Nguyen et al.

(10) Patent No.: US 11,995,541 B2
(45) Date of Patent: May 28, 2024

(54) SYSTEMS AND METHODS FOR LOCATION THREAT MONITORING

(71) Applicant: Proofpoint, Inc., Sunnyvale, CA (US)

(72) Inventors: Harold Nguyen, San Carlos, CA (US); Michael Lee, Aptos, CA (US); Daniel Oshiro Nadir, Carlsbad, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 576 days.

(21) Appl. No.: 16/271,013

(22) Filed: Feb. 8, 2019

(65) Prior Publication Data
US 2020/0193284 A1 Jun. 18, 2020

Related U.S. Application Data

(60) Provisional application No. 62/779,917, filed on Dec. 14, 2018.

(51) Int. Cl.
| | | |
|---|---|---|
| *G06N 20/00* | (2019.01) | |
| *G06F 40/30* | (2020.01) | |
| *G06N 3/08* | (2023.01) | |
| *G06N 5/04* | (2023.01) | |
| *G06N 7/01* | (2023.01) | |

(52) U.S. Cl.
CPC ............... *G06N 3/08* (2013.01); *G06F 40/30* (2020.01); *G06N 5/04* (2013.01); *G06N 7/01* (2023.01); *G06N 20/00* (2019.01)

(58) Field of Classification Search
CPC . G06N 3/08; G06N 5/04; G06N 7/005; G06F 40/30
See application file for complete search history.

(56) References Cited

U.S. PATENT DOCUMENTS

| | | | |
|---|---|---|---|
| 8,392,998 B1 * | 3/2013 | Schrecker | H04L 63/1416 |
| | | | 726/25 |
| 9,552,548 B1 | 1/2017 | Brestoff | |
| (Continued) | | | |

OTHER PUBLICATIONS

Lisa Vaas, "Facebook has filed patents to predict our future locations," [retrieved from << https://nakedsecurity.sophos.com/2018/12/14/facebook-has-filed-patents-to-predict-our-future-locations/>>] Dec. 8, 2018, 12 pages.

(Continued)

*Primary Examiner* — David R Vincent
(74) *Attorney, Agent, or Firm* — SPRINKLE IP LAW GROUP (57) ABSTRACT

Disclosed is a new location threat monitoring solution that leverages deep learning (DL) to process data from data sources on the Internet, including social media and the dark web. Data containing textual information relating to a brand is fed to a DL model having a DL neural network trained to recognize or infer whether a piece of natural language input data from a data source references an address or location of interest to the brand, regardless of whether the piece of natural language input data actually contains the address or location. A DL module can determine, based on an outcome from the neural network, whether the data is to be classified for potential location threats. If so, the data is provided to location threat classifiers for identifying a location threat with respect to the address or location referenced in the data from the data source.

20 Claims, 8 Drawing Sheets

(56) References Cited

U.S. PATENT DOCUMENTS

| | | | |
|---|---|---|---|
| 9,953,080 B1* | 4/2018 | Compton | G06Q 10/0635 |
| 10,142,213 B1 | 11/2018 | Hart | |
| 2008/0290987 A1* | 11/2008 | Li | G06Q 30/02 |
| | | | 340/5.1 |
| 2009/0254545 A1* | 10/2009 | Fisken | G06Q 30/02 |
| 2014/0172495 A1* | 6/2014 | Schneck | G06Q 10/0635 |
| | | | 705/7.28 |
| 2014/0283055 A1* | 9/2014 | Zahran | G06F 16/353 |
| | | | 726/23 |
| 2015/0058344 A1* | 2/2015 | Bhatia | G06F 16/285 |
| | | | 707/737 |
| 2016/0100301 A1* | 4/2016 | Gaurav | H04W 4/12 |
| | | | 455/404.2 |
| 2016/0371618 A1* | 12/2016 | Leidner | G06N 5/025 |
| 2017/0083821 A1* | 3/2017 | Foerster | G06N 5/022 |
| 2018/0109550 A1* | 4/2018 | Huang | H04L 63/1425 |
| 2020/0065383 A1* | 2/2020 | Hadi | G06Q 30/02 |
| 2020/0111038 A1* | 4/2020 | Ward | G06F 16/353 |

OTHER PUBLICATIONS

European Search Report in Patent Application No. 19213644.8 dated May 12, 2020, 8 pgs.
Examination Report issued for European Patent Application No. 19213644.8, dated Feb. 23, 2022, 7 pages.

* cited by examiner

Add a Location

| | |
|---|---|
| Location Label: | A Label for this Location |
| Location Names: | Location Search Terms [Add] |
| Location Address: | For example - Proofpoint, Sunnyvale [Search Location] |
| Search Radius (km): | 1 |
| Tags to Apply: | None |
| Notes: | |

☐ HQ/Large Location  ☐ Branch/Small Location  (?)

[Cancel] [Add Location]

Add a Brand

| | |
|---|---|
| Brand Label: | A Label for this Brand |
| Brand Names: | Search term (e.g. proofpoint)  [Add] |
| Brand Email Domain: | For example - proofpoint.com |
| Twitter Accounts: | [Add] |
| Tags to Apply: | None |
| Notes: | |

[Cancel] [Add Brand]

Harold @watt  4m

There is a man at Funplace Muffin that should be arrested for murder

FIG. 6

Haroldn88 (harold@nexgate.com)  [PATROL INSTALLED]
Account

Policy Categories: Log All Apps
Location Reference: Funplace

Harold @watt
Tweet at 08/30/18 3:59:27 PM
Reported Location: Sunnyvale, CA US There is a man at Funplace Muffin that should be arrested for murder See less View on Twitter | Posted via: Twitter Web Client Detected at: 08/30/18 4:00:26 PM
Action(s): Log
Identifier: 17f8aea7-15cf-44c4-b19b-a3e280109d6c
Date Archived: 08/30/18 4:00:28 PM Actions ▽

WorkersGroup
@WG_ProtestDay          [Follow ▽]

ProtestDay demonstration tomorrow in front of the bank, downtown #YourCity.
StandingWithFakeDayRights
facebook.com/events/123456...

FIG. 8A

Rene Newsreporter
@rene_newsreporter      [Follow ▽]

BREAKING: We've received reports there is an active shooter at YourOffice. It's now under lockdown. Do not approach YourOffice.

SYSTEMS AND METHODS FOR LOCATION THREAT MONITORING

CROSS-REFERENCE TO RELATED APPLICATION(S)

This application claims a benefit of priority from U.S. Provisional Application No. 62/779,917, filed Dec. 14, 2018, entitled "SYSTEMS AND METHODS FOR LOCATION THREAT MONITORING," the entire disclosure of which is fully incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to data processing by artificial intelligence (AI). More particularly, this disclosure relates to AI-based monitoring systems and methods for intelligently processing data from disparate data sources and discovering locales referenced or implied in the data, useful for identifying potential threats to physical locations or places of interest in a scalable and timely manner.

SUMMARY OF THE DISCLOSURE

Today, political tension and conflict escalation in several regions combined with the global economy have created more security risks for protecting a company or organization's physical assets. Such physical assets can include everything from a company's secret data center, critical infrastructure assets, retail locations, to corporate headquarters, etc.

To mitigate security risks, companies, enterprises, and organizations alike may employ a variety of technologies to monitor the digital universe (e.g., the Internet) in an attempt to identify potential threats to the security of their physical assets and/or the safety of their on-location personnel. An example of a technology that may be employed for this purpose is natural language processing (NLP).

NLP is a subfield of computer science, information engineering, and artificial intelligence (AI). A computer system programmed with NLP is capable of processing and analyzing large amounts of natural language data. Without NLP programming, conventional computers can process and analyze data in computer languages, but not natural languages.

Technical challenges in NLP can include natural language understanding (NLU), which is a subtopic of NLP in AI that deals with machine reading comprehension—the ability for a machine to process text, understand its meaning, and to integrate with prior knowledge. In the field of AI, the most difficult problems are sometimes referred to as AI-hard. NLU is an AI-hard problem. This means that it cannot be solved by a simple specific algorithm.

For example, although different NLP systems may use different techniques to process data, they may operate to process each word in the natural language data (e.g., a text string), determine whether that word is a noun or a verb, past tense or present tense, and so on, and tag it accordingly. The NLP systems may also each have a lexicon (i.e., a vocabulary) and a set of grammar rules coded into it. Many NLP algorithms use statistical machine learning to apply the rules to the natural language data being processed and determine what is the most likely meaning of the natural language data being processed. By the end of this process, an NLP system should understand the natural language data it was tasked to process. However, some words can have several meanings (polysemy) and different words can have similar meanings (synonymy). Many of these natural language problems cannot be addressed in a simple specific algorithm. Rather, additional rules would need to be coded into an NLP system, which is then trained to learn and apply those rules correctly.

NLU is difficult in practice because a machine must be able to deal with unexpected circumstances while solving any real-world problem. That is, a machine must have an efficient (in terms of speed and accuracy) reading comprehension, including the ability to know the meaning of words, the ability to understand the meaning of a word from discourse context, the ability to follow organization of a passage and to identify antecedents and references in it, the ability to draw inferences from a passage about its contents, the ability to identify the main thought of a passage, the ability to answer questions in a passage, the ability to recognize a syntactic or propositional structure in a passage and determine its tone (tonality), the ability to understand a situational mood conveyed (e.g., assertions, questioning, commanding, refraining etc.), the ability to determine a purpose, intent, or point of view, and draw an inference from it, etc. While the rule-based NLP approach described above can help train a machine to achieve some level of reading comprehension that can be quite useful in many cases, inventors of this disclosure have identified a critical technological gap that has not been adequately addressed by the existing NLP technology.

As discussed above, political tension and conflict escalation in several regions combined with the global economy have created more security risks for protecting a company or organization's physical assets. In today's increasingly connected world, bad actors (e.g., suspicious or disgruntled individuals) posing such security risks often spread their messages through various channels on the Internet, for instance, social media, dark web, blogs, online publications, digital platforms/mediums, etc.

However, while some of these bad actors could be in and around a company or organization's key locations, the threatening language in their messages may not include a specific location or address. This means that some location threats may not be timely detected by a machine programmed with a generally static lexicon and a set of generally fixed grammar rules.

That is, the existing NLP technology is proficient at identifying potential location threats from natural language input data (e.g., messages, posts, comments, blogs, tweets, articles, emails, etc.) if a specific location or address (that a NLP system is specifically trained to recognize) or geo coordinate metadata (e.g., geo tags) can be found in the input data. However, the existing NLP technology is unable to identify potential location threats when there is no mention of a specific location or address in the input data. This creates a technological gap that can have very serious real-world consequences.

Further complicating the matter is the number and/or size of locations that may need to be monitored at any given time. For the safety of personnel and customers, a company or organization should be aware of real-time threats and potentially troubling events in or around key locations—such as company headquarters, retail sites, etc. However, a company's key locations are not limited to locations or physical buildings owned by the company and can include places where the company does business and/or host/sponsor events. This can potentially include a huge number of places including, for instance, malls, parking lots, business parks, or frequently accessed locations, such as airports, and many populated areas, such as concerts, corporate-hosted events, holidays parades, sports arenas, etc.

Another consideration is the number and/or type of location threats that may need to be monitored at any given time. For example, corporate boycotts and protest events aim to undermine a company and tarnish its brand. Even if a company is not specifically targeted, it may be desirable to monitor certain events that are near or around its locations. For example, larger protest movements against economic and social inequality can impact a company employee's safety and disrupt operations. Further, coordinated events and actions that occur at business locations and critical infrastructure can prevent successful day-to-day operation and can be harmful to vital infrastructure, such as hospitals, emergency response systems, and energy systems that have physical assets and projects in area where people are protesting or rioting.

Adding to the complexity of the problem is the randomness and unpredictability of where and when an attack can take place. According to the U.S. Department of Homeland Security: "In many cases, there is no pattern or method to the selection of victims by an active shooter, and these situations are by their very nature unpredictable and evolve quickly."

In view of the foregoing, there is a need for a new AI-based location threat monitoring solution that is capable of real-time situational awareness of location threats or security risks to a company or organization, that can identify different types of location threats, including planned attacks or protests, lone-wolf attacks, and so on, without having to rely on predefined rules, and that can do so in a scalable and timely manner. Embodiments disclosed herein can address this need and more.

An object of the invention is to provide an AI-based location threat monitoring solution that fills the critical technological gap in the existing NLP technology described above. In embodiments disclosed herein, this object is achieved in a location threat monitoring module that can timely identify various types of location threats or security risks to a company or organization, even if a specific location, address, or geo tag is not mentioned or found in the natural language input data to the location threat monitoring module.

In some embodiments, a system implementing the location threat monitoring module is communicatively connected to disparate data sources. Natural language data from the disparate data sources is provided as input to the location threat monitoring module. In some embodiments, the location threat monitoring module includes a deep learning model that is particularly trained to read and understand the natural language input data and determine whether the natural language input data should be further processed for location threats. Specifically, the deep learning model is particularly trained to recognize whether a piece of natural language input data references a location that could be of interest to an entity (e.g., a company, enterprise, organization, or the like). Such a location reference can be non-specific to an address or landmark. More importantly, such a location reference can be vague and/or generic (e.g., "downtown," "city," "park," etc.), or even unrelated to an address or landmark (e.g., a brand name, a company name, etc.). With the existing NLP technology, while such individual words may be found in an NLP lexicon, because they do not indicate a specific location or address, the inclusion of these words in the natural language input data generally does not trigger a location threat alert.

To fill this gap, the deep learning model is trained to recognize a purpose, intent, or point of view in the natural language input data and draw an inference from it with respect to any location or place that may be of interest to an entity, rather than looking for specific locations, addresses, or geo tags. What is of interest to an entity may be provided by the entity to the system implementing the location threat monitoring module over a network. In some embodiments, the system implementing the location threat monitoring module can also be communicatively connected to client devices. As an example, a security risk analyst working for Company A may log in to a portal, gateway, or dashboard provided by the system and instruct the system to monitor certain brand information for Company A. Suppose the system receives a message from one of its disparate data sources and the message references "downtown" and mentions a brand identified in the brand information. In such a case, the deep learning model of the location threat monitoring module can identify the message as a candidate for location threat classification, even if the message itself does not contain any specific physical location, address, or geo tag.

One embodiment may comprise a system having a processor and a memory and configured to implement the location threat monitoring method disclosed herein. One embodiment may comprise a computer program product that comprises a non-transitory computer-readable storage medium storing computer instructions that are executable by a processor to perform the location threat monitoring method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
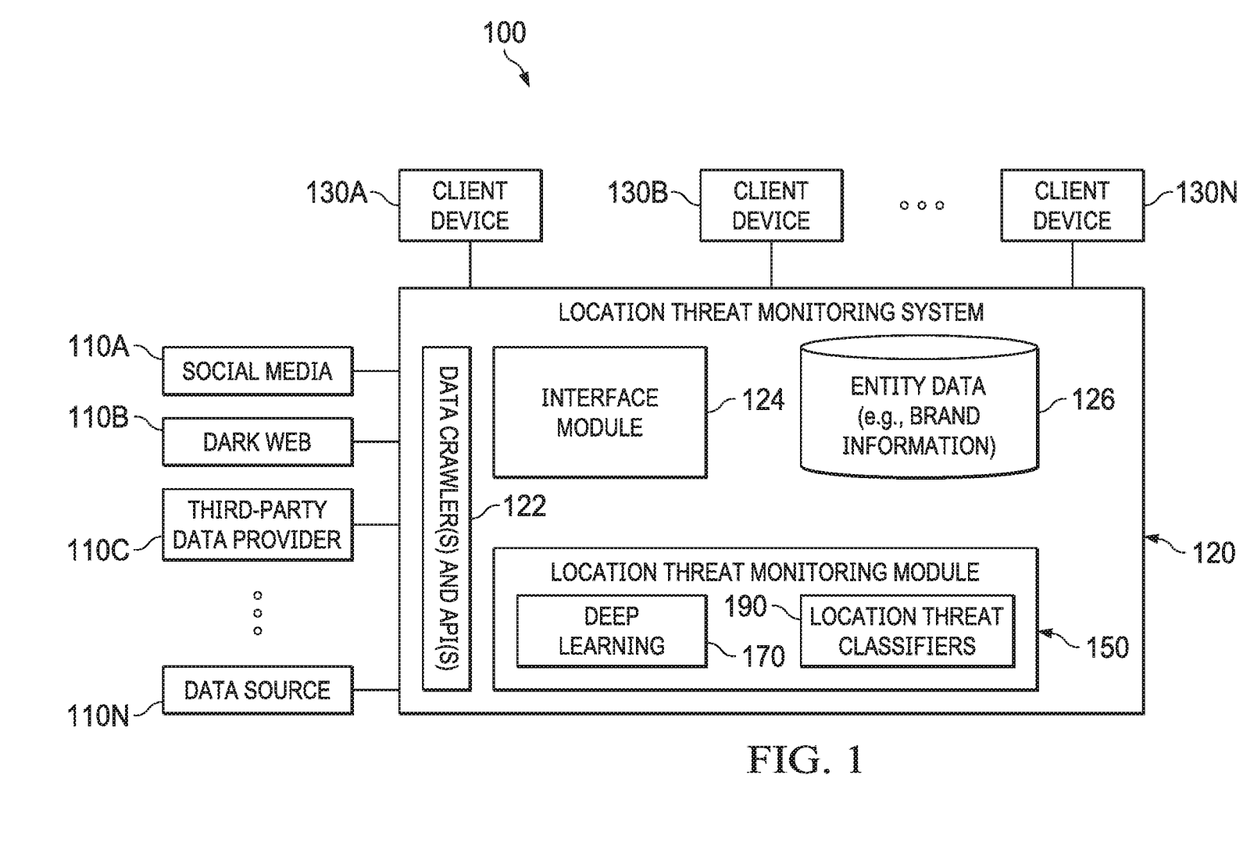
FIG. 1 depicts a diagrammatic representation of a distributed computing environment in which embodiments disclosed here can be implemented.

FIG. 1 depicts a diagrammatic representation of distributed computing environment 100 in which embodiments disclosed here are implemented. As illustrated in FIG. 1, location threat monitoring system 120 may be communicatively connected to disparate data sources such as social media 110A, dark web 110B, third-party data provider 110C, ..., and many other digital platforms/mediums 110N, as well as client devices 130A, 130B, ..., 130N. Client devices may be associated with entities (e.g., companies, organizations, enterprises, etc.) that utilize the location threat monitoring function or service provided by location threat monitoring system 120. As explained below, an authorized user (e.g., a security risk analyst for an enterprise) may access a user interface (e.g., a portal, gateway, dashboard, etc.) provided by location threat monitoring system 120. Through this user interface (UI), the user can instruct location threat monitoring system 120 on what location and/or brand information that location threat monitoring system 120 should monitor. Such user-provided entity data (e.g., the enterprise's key locations, brand information, etc.) can be stored in data store 126.

In response, location threat monitoring module 150 of location threat monitoring system 120 is operable to examine data pushed and/or pulled from data sources 110A . . . 110N, identify any location threat even if an address is not specifically mentioned in the data, and generate an alert when a location threat is identified. In some embodiments, the alert can be published to the analyst's home page or dashboard for review by the analyst. In some embodiments, location threat monitoring module 150 may generate a notification about the alert and send the notification out to any authorized user of the enterprise through a notification channel or channels (e.g., emails, device-driven notification services, etc.).

In some embodiments, location threat monitoring system 120 can operate on a server platform or hosted in a cloud computing environment. In some embodiments, location threat monitoring system 120 can include data crawler(s) and/or application programming interface(s) (API(s)) configured for communicating with disparate data sources 110A . . . 110N. Depending upon implementation, data may be pushed and/or pulled from a data source. For example, for social media 110A, which has a public API, a data crawler can be configured to query social media 110A using the API provided by social media 110A. For dark web 110B, which is not accessible using standard browsers, a special crawler capable of accessing and crawling encrypted sites may be utilized to pull data from dark web 110B. Additionally or alternatively, location threat monitoring system 120 can set up a communication channel with third-party data provider 110C such that third-party data provider 110C can push data to location threat monitoring system 120, for instance, at a configurable interval, through an API provided by location threat monitoring system 120.

Figure 2:
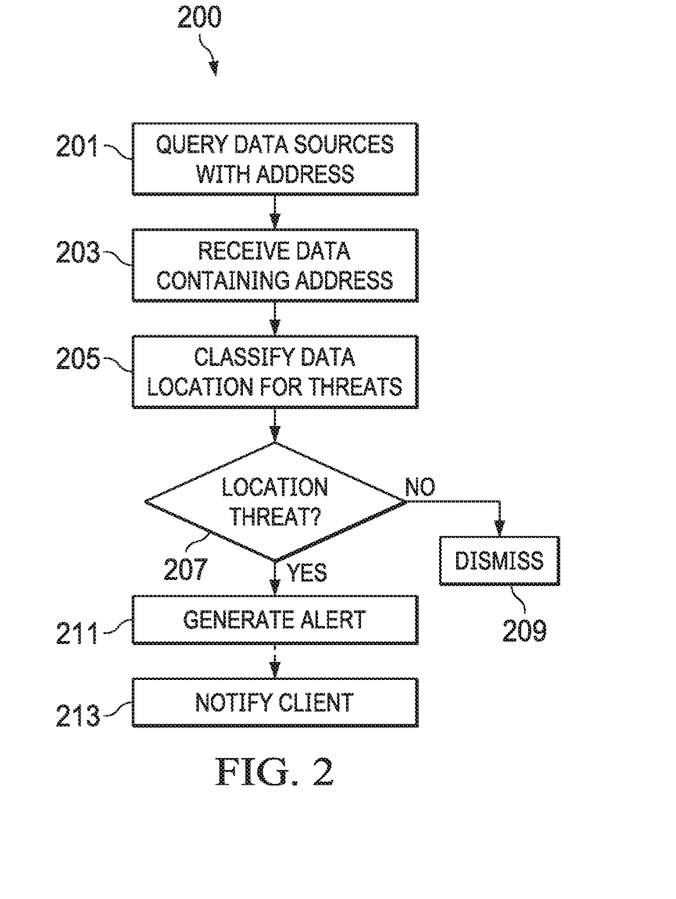
FIG. 2 depicts a flow chart illustrating a process flow that utilizes location threat classifiers according to some embodiments.
Figure 3A:
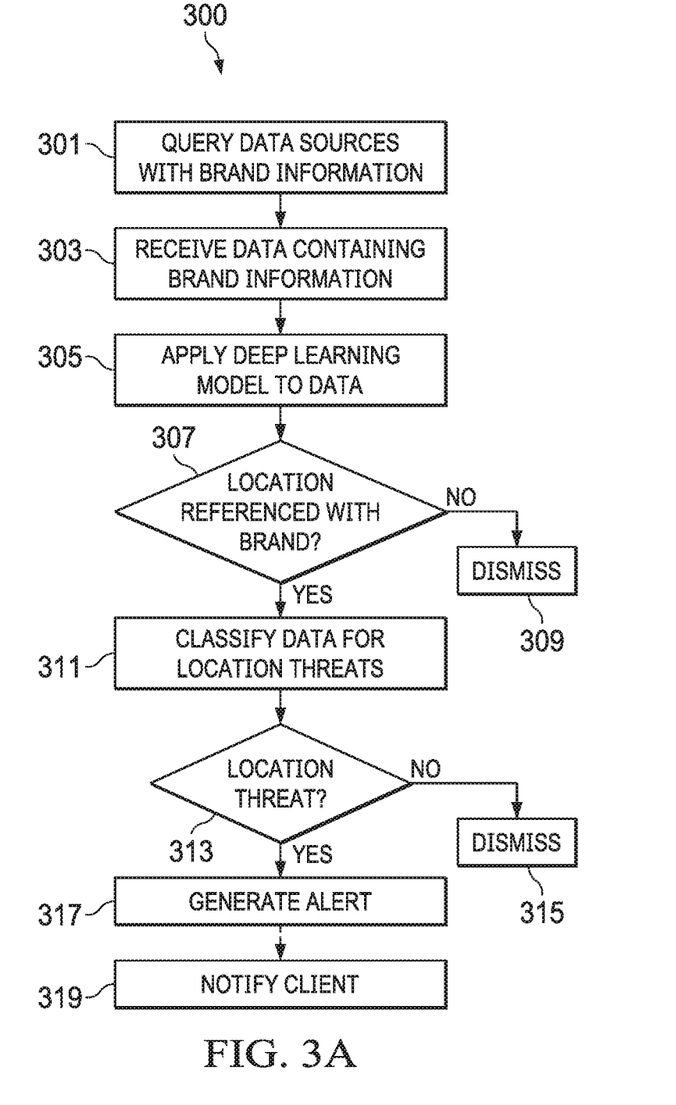
FIG. 3A depicts a flow chart illustrating a process flow that utilizes both a deep learning module and location threat classifiers according to some embodiments.

In some embodiments, location threat monitoring module 150 of location threat monitoring system 120 can include deep learning (DL) module 170 and location threat classifiers 190. FIG. 2 is a flow chart illustrating process flow 200 that utilizes location threat classifiers 190. FIG. 3A is a flow chart illustrating process flow 300 that utilizes both DL module 170 and location threat classifiers 190. As explained in more details below, DL module 170 complements location threat classifiers 190 and improves location threat monitoring system 120 with its ability to recognize potential location threats in the data that may otherwise be missed because the data lacks specific addresses.

Figure 4:
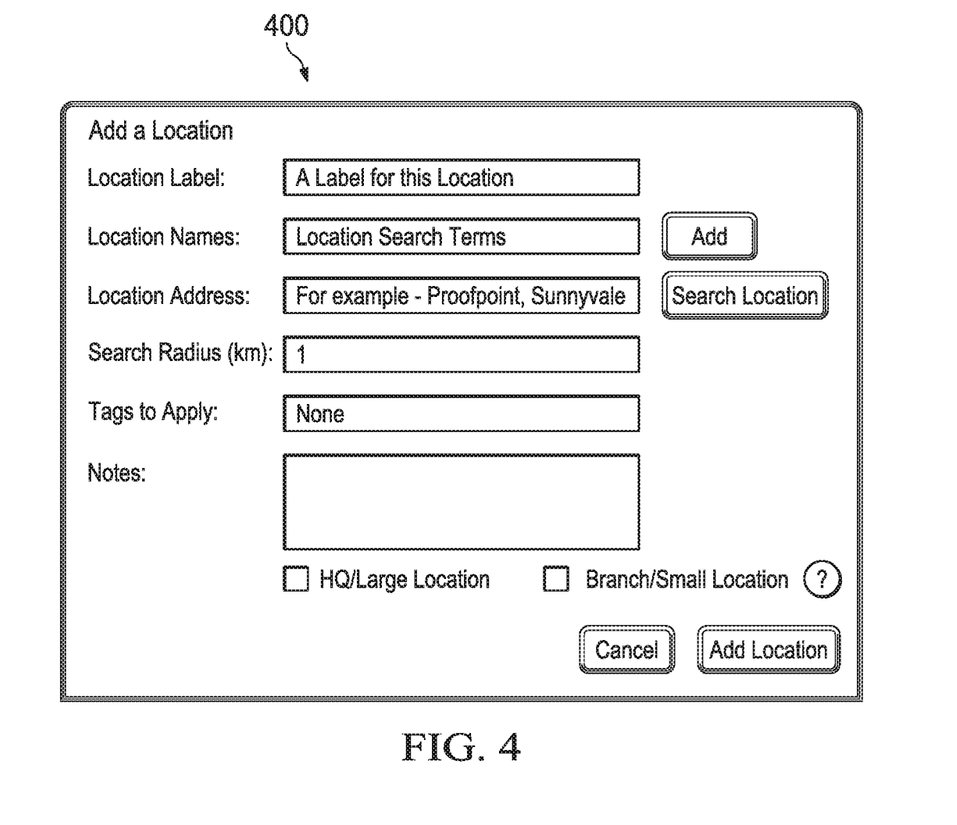
FIG. 4 depicts a diagrammatic representation of an example of a user interface that can be generated by an interface module of a location threat monitoring system for displaying on a client device an entry form for submission of a location address to the location threat monitoring system according to some embodiments.

In the example of FIG. 2, process flow 200 begins with querying one or more data sources 130A N with a location address provided by an enterprise user to location threat monitoring system 120 (201). FIG. 4 depicts an example of UI 400 that can be generated by interface module 124 for display on client device 130A so that a location address of interest to an entity (e.g., an employer of the enterprise user) can be provided to location threat monitoring system 120.

In response to the query (which contains the location address), the one or more data sources 130A N can return, to location threat monitoring system 120, data containing the location address (203). As a non-limiting example, a query by a TWITTER crawler to a TWITTER API concerning "123 Main Street" will return TWEETS containing "123 Main Street." In some cases, a search parameter defining a surrounding area (e.g., a configurable radius) of the location address may be used. In this way, data having addresses that are within the defined area, radius, or vicinity will also be returned (e.g., "100 Main Street," "200 Main Street," etc.). As discussed above, for some data sources, this querying step is not necessary. Rather, a push model may be implemented so that such data sources may be configured to search a location address (or addresses) and push the result to location threat monitoring system 120, for instance, on a periodic basis (e.g., every five minutes, every three hours, every day, etc.).

The data pushed to or pulled by location threat monitoring system 120 from the one or more data sources 130A N can undergo a preprocessing step, if necessary, to clean up and/or prepare the data as input to location threat classifiers 190, and then be fed through location threat classifiers 190 (205). Each location threat classifier is a NLP model specially trained to identify a type of location threat (e.g., general hazard, physical threat, protest language, public safety, etc.).

For example, a general hazard classifier may process a text string from the input data, identify words in the text string (using its lexicon), and determine, based on the grammar rules and how it was trained to apply, whether the text string is to be classified as "general hazard." For instance, data containing phrases like "traffic accident" and/or "power outage" may be classified as "general hazard." Likewise, a physical threat classifier can be specially trained to classify data containing speech that shows intent on committing physical violence against another, a protect language classifier can be specially trained to classify data containing protest language such as "riot," "protest," "boycott," etc., and a public safety classifier can be specially trained to classify data containing words and/or phrases like "police activity," "bomb threats," "active shooter," etc.

These special classifiers (trained/tested NLP models) can act as filters in that they can comb through a massive amount of data and quickly identify a location threat with respect to the location address of interest. When a piece of data is classified as containing a location threat (207), an alert is generated (211). Otherwise, the piece of data is dismissed (209). The alert can be communicated to client device 130A (213) through various communication and/or notification channels (e.g., through UI 700 shown in FIG. 7).

Figure 5:
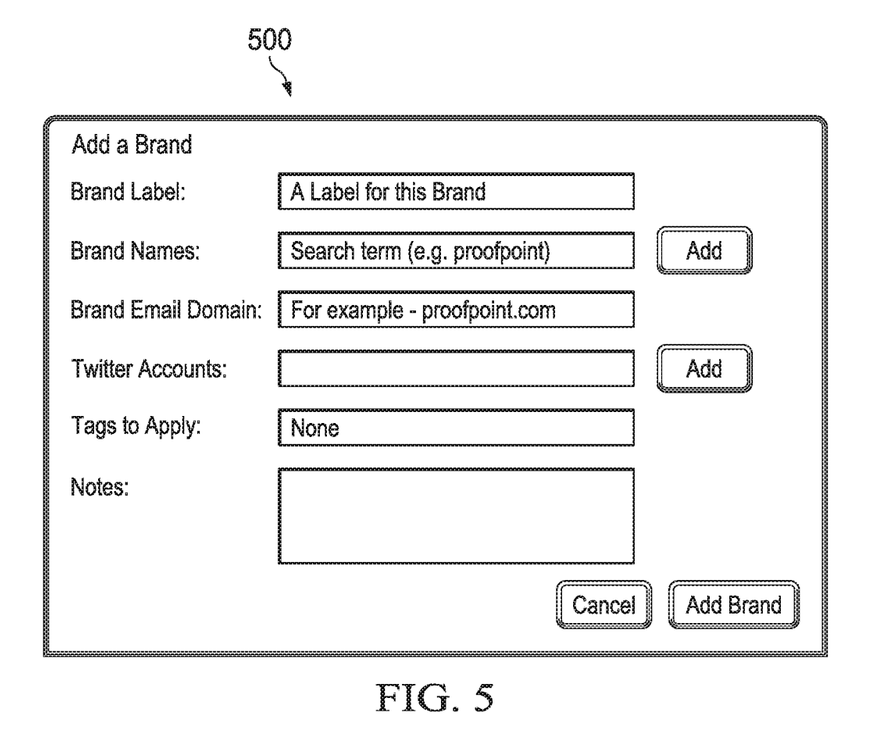
FIG. 5 depicts a diagrammatic representation of an example of a user interface that can be generated by an interface module of a location threat monitoring system for displaying on a client device an entry form for submission of brand-related information to the location threat monitoring system according to some embodiments.

In the example of FIG. 3A, process flow 300 begins with querying one or more data sources 130A N on brand information provided by an enterprise user to location threat monitoring system 120 (301). FIG. 5 depicts an example of UI 500 that can be generated by interface module 124 for display on client device 130A so that brand-related information of interest (e.g., a brand label, a brand name, a brand domain, brand-related search terms, etc.) to an entity (e.g., an employer of the enterprise user) can be provided to location threat monitoring system 120 (e.g., in the form of a request for brand protection, a message requesting brand location threat monitoring, a submission for brand information registration, etc.).

Figure 6:
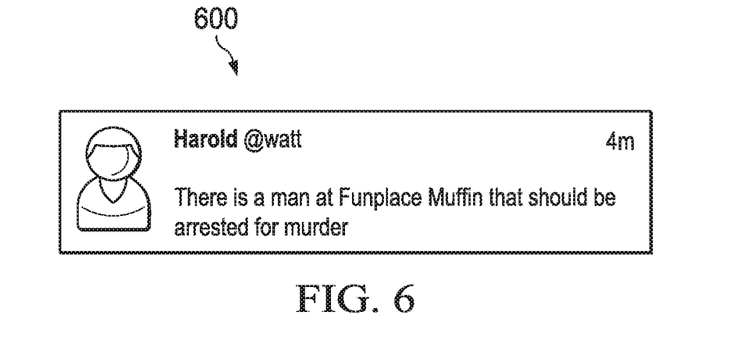
FIG. 6 depicts a diagrammatic representation of an example of a result received by a location threat monitoring system from querying a data source, the result containing brand-related information according to some embodiments.

In response to the query (which contains the brand information such as a brand name), the one or more data sources 130A N can return, to location threat monitoring system 120, data containing the brand information (303). As a non-limiting example, a query by a TWITTER crawler to a TWITTER API concerning "Funplace" will return TWEETS containing "Funplace," an example of which is shown in FIG. 6. Similar to process flow 200, for some data sources, the querying step is not necessary. Rather, a push model may be implemented so that such data sources may be configured to search information concerning a brand and push the result to location threat monitoring system 120, for instance, on a periodic basis (e.g., every five minutes, every three hours, every day, etc.). However, unlike process flow 200, data thus received by location threat monitoring system 120 through process flow 300 may not have any specific address or location.

The data pushed to or pulled by location threat monitoring system 120 from the one or more data sources 130A N can undergo a preprocessing step, if necessary, to clean up and/or prepare the data as input to DL module 170 where a DL model is applied to data from a data source (305). In some embodiments, DL module 170 can include a plurality of DL models, each of which can be built using a machine learning (ML) software library based on DL artificial neural networks (ANNs), such as a deep NN (DNN), a recurrent neural NN (RNN), etc. An ANN is not an algorithm but a framework for different ML algorithms to work together and process complex data inputs. ANNs are connected computing systems that can learn to perform tasks by considering examples, without needing to be programmed with task-specific rules. A DNN is an ANN with multiple layers between the input and output layers. A complex DNN can have many layers. The network moves through the layers calculating the probability of each output. An RNN is a class of ANN in which connections between nodes form a directed graph along a sequence and data can flow in any direction. DNNs and RNNs are examples of DL architectures that can produce results that sometimes are superior to human experts. TensorFlow, available from tensorflow.org, is an example of a ML software library that can be used for building ML applications such as DNNs. Each DL model thus built can be trained on a sample data set from the same data source for which the DL model is specifically built. ANNs, DNNs, RNNs, and TensorFlow are known to those skilled in the ML art and thus are not further described herein.

As those skilled in the ML art can appreciate, the specific details of how to build a DL model can vary from implementation to implementation, as each DL model can be trained and tuned to analyze input data from a specific data source. Even so, the process of building a DL model for a data source can follow a ML pipeline that includes the following stages: data collection, data transformation, feature engineering, model building, evaluation and refinement, and, finally, prediction.

As a non-limiting example, TWEETS usually have little to no context, are quite informal, and may contain incorrect grammar, typos, arbitrary abbreviations, or even non-English words, emojis (e.g., bomb, gun, knife, or ambulance, etc.), memes (e.g., bloody scenes, violent scenes, etc.), and so on. Such variations from formal English can make TWEETS difficult for a rule-based NLP model to comprehend their purposes, intents, or meanings. To build a DL model capable of understanding and comprehending TWEETS, thousands of data points (e.g., labeled TWEETS) would be needed for supervised learning. Such data points may be crowdsourced (e.g., through AMAZON Mechanical Turk) or obtained from a data provider. The labeled TWEETS (i.e., DL training/testing data points) can then be transformed, for instance, through tokenization using a lexicon or lexicons (e.g., lexicons for locations), and building word vectors representing relationships between the tokens. The word vectors can then be used to build feature vectors as input to an ANN (e.g., a CNN, an RNN, etc.) that is then trained (e.g., through supervised learning using 80% of the sample data set) to recognize a location reference ("downtown") with respect to an entity of interest (e.g., a brand). The trained ANN can be evaluated (e.g., tested using 20% of the sample data set), refined (tuned), and then used to process new data from the same data source and generate an outcome that indicates a likelihood (e.g., a probability score) that that the new data from the data source (e.g., a TWEET from TWITTER) references or infers a location relating to the brand. Again, this location need not be a specific address and can be any locale of interest to the brand (e.g., a stadium hosting an event sponsored by the brand, a city or area or even country where the brand has a physical presence, etc.).

The DL module can determine, based on the outcome from the ANN relative to a configurable threshold (e.g., the probability score meets or exceeds the threshold), whether the new data should be classified for potential location threats (307). If not, the new data is dismissed (309). If so, the new data is fed through location threat classifiers 190 in a manner that is similar to the classifying step described above (311). In this case, location threat classifiers 190 can identify a location threat with respect to the location referenced in the new data.

When a piece of data is classified as containing a location threat (313), an alert is generated (317). Otherwise, the piece of data is dismissed (315). As before, the alert can be communicated to client device 301A (319) through various communication and/or notification channels (e.g., through UI 700 shown in FIG. 7).

Figure 3B:
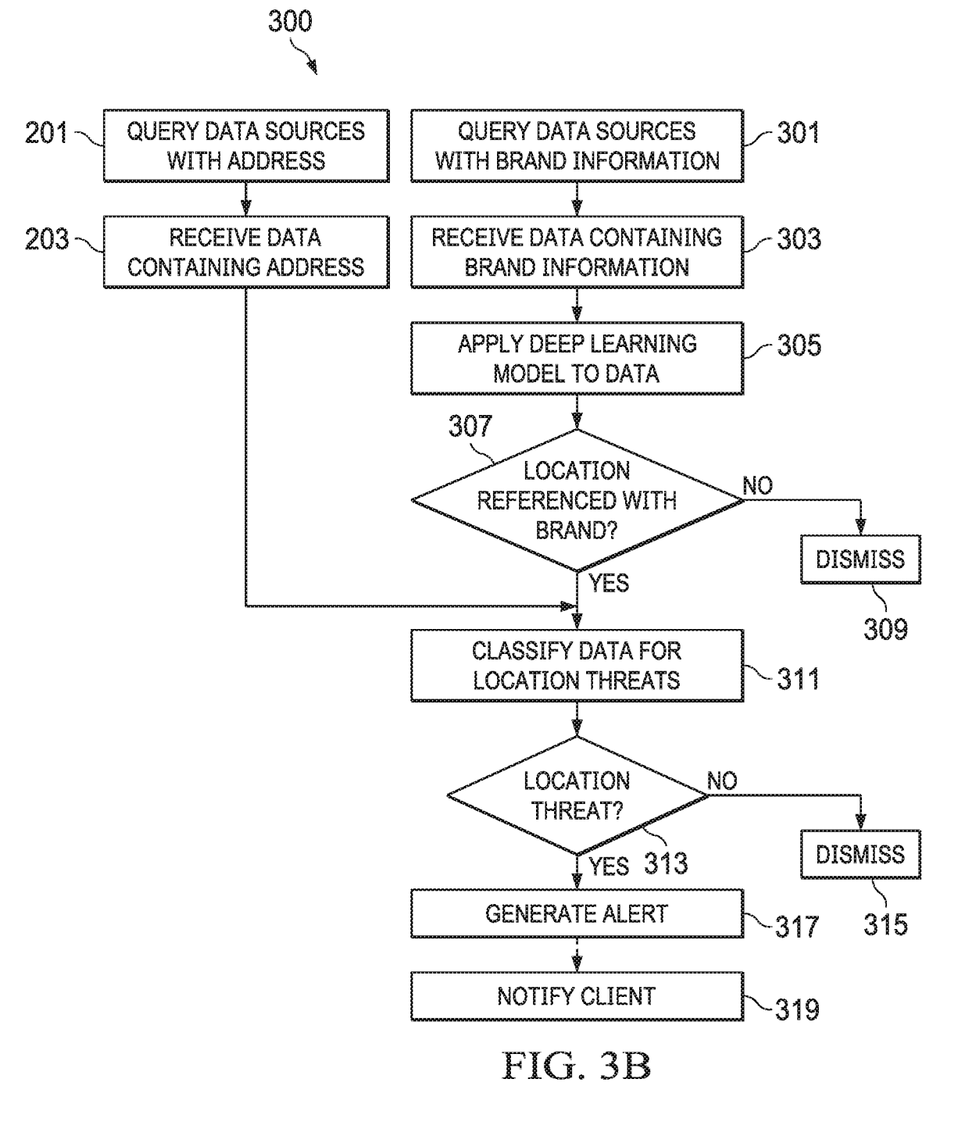
FIG. 3B depicts a flow chart in which parts of process flows shown in FIG. 2 and FIG. 3 can be performed concurrently to provide different sets of input data to location threat classifiers according to some embodiments.

In some embodiments, some parts of process flow 200 and process flow 300 described above can be performed concurrently to provide different sets of input data to location threat classifiers 190. This is shown in FIG. 3B.

Figure 7:
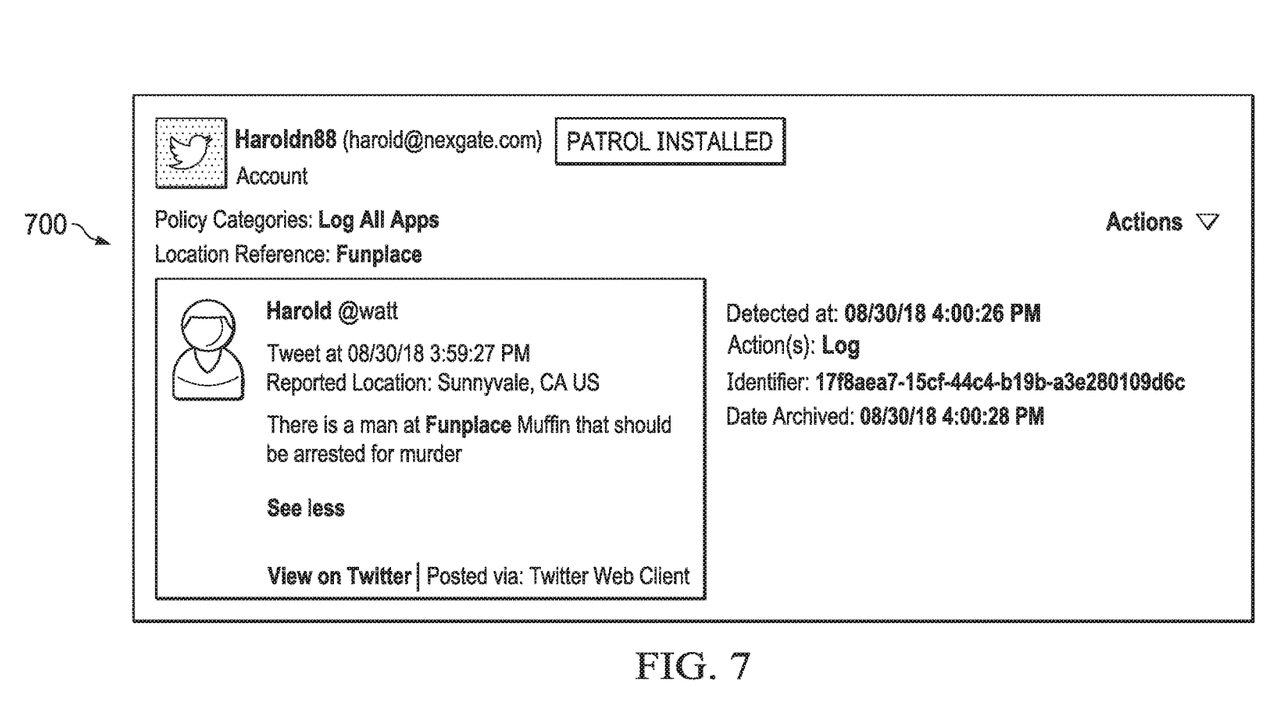
FIG. 7 depicts a diagrammatic representation of an example of a user interface that can be generated by an interface module of a location threat monitoring system for displaying an alert on a client device according to some embodiments.

In some embodiments, an entity can provide an address, a brand, or both to location threat monitoring system 120 as search parameters. In turn, location threat monitoring system 120 can use those search parameters to do a search query on a social media site, the dark net, etc. and alert the entity (through their account with location threat monitoring system 120 and/or other communication channels) with a result of the search indicating any potential location threat. The result may pertain to the brand and a location or just the location. An example of the result is shown in FIG. 7.

In the example of FIG. 6, TWEET 600 contains an entity of interest (e.g., a brand called "Funplace") and is retrieved or pulled from TWITTER by a TWITTER crawler of location threat monitoring system 120 querying a TWITTER server using an API provided by TWITTER. As shown in the example of FIG. 7, it can be seen that the TWITTER API returns additional information associated with TWEET 600, including a timestamp of when TWEET 600 was posted and a reported location from where TWEET 600 was generated. Thus, in some embodiments, a TWEET can include the textual content and additional information associated with the TWEET that is also provided by the TWEETER server. The DL model can be trained to recognize, from all the data provided by the TWEETER server and not just the content of a TWEET, whether the TWEET references a location that is of interest to the brand. In this example, the DL model can recognize that TWEET 600 contains the brand "Funplace" and is reported from a location "Sunnyvale, CA US." In this context, the DL model can understand that the word "Funplace" mentioned in TWEET 600 is actually a reference to a physical location of the brand and not just the name of the brand. Based on this understanding, the DL model can generate an outcome that indicates that TWEET 600 is a candidate for location threat classification. Based on this outcome, DL module 170 can pass TWEET 600 to location threat classifiers 190 which, in turn, may classify TWEET 600 as a physical threat at the referenced location based on, for instance, the threating language and tonality of TWEET 600 that "a man at Funplace Muffin should be arrested for murder."

As described above, this classification can, in turn, trigger the generation of an alert. A non-limiting example of how an alert can be presented to a user through UI 700 is shown in FIG. 7. Many other implementations are also possible.

Figure 8A:
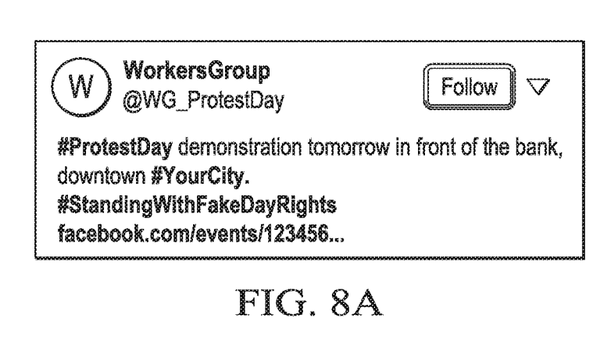
FIGS. 8A and 8B illustrate non-limiting examples of potential location threats that can be detected or otherwise flagged by a location threat monitoring system disclosed herein.
Figure 8B:
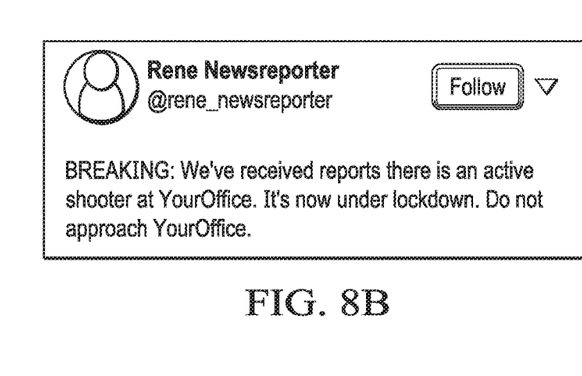

FIGS. 8A and 8B illustrate additional non-limiting examples of TWEETS that can be detected or otherwise flagged by an embodiment of location threat monitoring system 120 disclosed herein as indicating potential location threats. As yet another example, an input text string "At John Doe High School, there is going to be a shooting at the cafeteria on campus" may indicate a brand "John Doe High School" and location references "John Doe High School" and "cafeteria on campus." This text string would first be identified by DL module 170 as a candidate for location threat classification and then be classified (e.g., detected) by a classifier (e.g., a public safety classifier) that "there is going to be a shooting."

Although TWEETS are used as examples of data points, those skilled in the art understand that other types of data points can be processed by embodiments disclosed herein. Further, although TWITTER is used as an example of a data source for which a DL model is trained, tested, and used in this disclosure, those skilled in the art understand that additional DL models can be trained, tested, and used to understand data from different data sources and infer any location that could be of interest to a company, enterprise, organization, etc., even if no specific address is mentioned.

Figure 9:
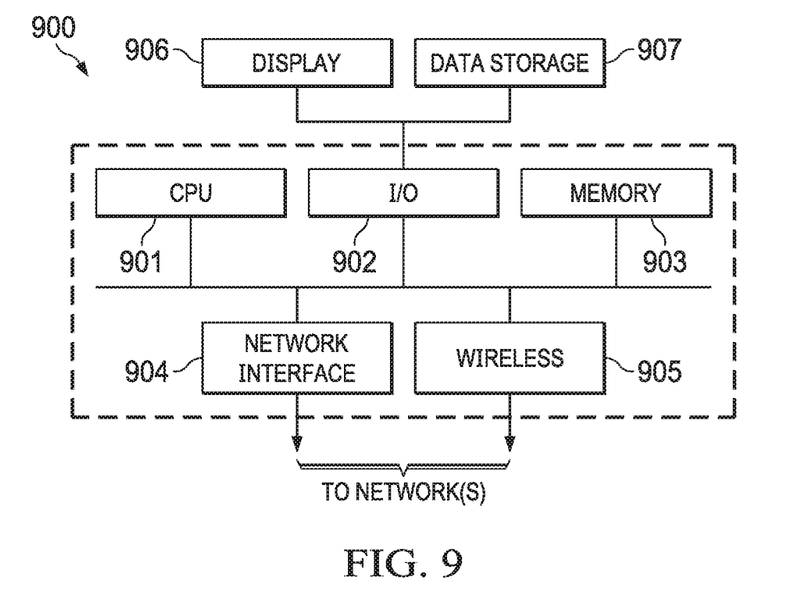
FIG. 9 depicts a diagrammatic representation of a data processing system for implementing a location threat monitoring system disclosed herein.

FIG. 9 depicts a diagrammatic representation of a data processing system for implementing a location threat monitoring system disclosed herein. As shown in FIG. 9, data processing system 900 may include one or more central processing units (CPU) or processors 901 coupled to one or more user input/output (I/O) devices 902 and memory devices 903. Examples of I/O devices 902 may include, but are not limited to, keyboards, displays, monitors, touch screens, printers, electronic pointing devices such as mice, trackballs, styluses, touch pads, or the like. Examples of memory devices 903 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 900 can be coupled to display 906, information device 907 and various peripheral devices (not shown), such as printers, plotters, speakers, etc. through I/O devices 902. Data processing system 900 may also be coupled to external computers or other devices through network interface 904, wireless transceiver 905, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
    obtaining or receiving, from a data source, first data containing textual information relating to an address, the obtaining or receiving performed by a location threat monitoring system operating on a computer, the location threat monitoring system configured to detect potential threats relating to addresses or locations of interest to the brand;
    obtaining or receiving, from the data source, concurrently with the first data, second data containing textual information relating to a brand, the obtaining or receiving performed by the location threat monitoring system;
    providing the textual information relating to the brand to a deep learning (DL) model specifically trained and tuned to analyze input data from the data source, the DL model comprising an artificial neural network (ANN), wherein the ANN is trained, through supervised learning using sample data sets from the data source, to determine a likelihood that a piece of natural language input data from the data source relates to an address or location of interest to the brand, regardless of whether the piece of natural language input data actually contains the address or location, wherein the data from the data source has no specific address or location;
    determining, by the location threat monitoring system, whether the first data from the data source is to be classified for potential location threats;
    determining, by the location threat monitoring system, by comparing an outcome from the ANN with a threshold, whether the second data from the data source is to be classified for potential location threats, the outcome from the ANN comprising the probability score that the data from the data source references an address or location of interest to the brand;
    responsive to the first data being classified for potential location threats, providing the first data from the data source to location threat classifiers, wherein the location threat classifiers are operable to identify location threats with respect to any address or location relating to an address or location of interest to the brand; and
    responsive to the probability score from the ANN meeting or exceeding the threshold, concurrently with the first data being provided to the location threat classifiers, providing the second data from the data source to the location threat classifiers, wherein the location threat classifiers are operable to identify location threats with respect to any address or location relating to an address or location of interest to the brand.

2. The method according to claim 1, further comprising:
    receiving, over a network from a user device communicatively connected to the location threat monitoring system, a request for brand protection, the request containing a label, a name, a domain, or a search term for the brand.

3. The method according to claim 1, wherein the data from the data source is pushed to the location threat monitoring system or pulled by the location threat monitoring system on demand or on a periodic basis.

4. The method according to claim 1, wherein the ANN comprises a deep NN (DNN) or a recurrent neural NN (RNN).

5. The method according to claim 1, further comprising:
    preparing the data from the data source as input to the ANN; or
    preparing the data from the data source as input to the location threat classifiers.

6. The method according to claim 1, wherein each of the location threat classifiers comprises a natural language processing (NLP) model specially trained to identify a type of location threat.

7. A location threat monitoring system configured to detect potential threats relating to addresses or locations of interest to brands, comprising:
    a processor;
    a non-transitory computer-readable medium; and
    stored instructions translatable by the processor for:
        obtaining or receiving, from a data source, first data containing textual information relating to an address;
        obtaining or receiving, from the data source, concurrently with the first data, second data containing textual information relating to a brand;
        providing the textual information relating to the brand to a deep learning (DL) model specifically trained and tuned to analyze input data from the data source, the DL model comprising an artificial neural network (ANN), wherein the ANN is trained, through supervised learning using sample data sets from the data source, to determine a likelihood that a piece of natural language input data from the data source relates to an address or location of interest to the brand, regardless of whether the piece of natural language input data actually contains the address or location, wherein the data from the data source has no specific address or location;

determining, by a location threat monitoring system, whether the first data from the data source is to be classified for potential location threats;

determining, by the location threat monitoring system, by comparing an outcome from the ANN with a threshold, whether the second data from the data source is to be classified for potential location threats, the outcome from the ANN comprising the probability score that the data from the data source references an address or location of interest to the brand;

responsive to the first data being classified for potential location threats, providing the first data from the data source to location threat classifiers, wherein the location threat classifiers are operable to identify location threats with respect to any address or location relating to an address or location of interest to the brand; and responsive to the probability score from the ANN meeting or exceeding the threshold, concurrently with the first data being provided to the location threat classifiers, providing the second data from the data source to the location threat classifiers, wherein the location threat classifiers are operable to identify location threats with respect to any address or location relating to an address or location of interest to the brand.

8. The location threat monitoring system of claim 7, wherein the stored instructions are further translatable by the processor for:
receiving, over a network from a user device communicatively connected to the location threat monitoring system, a request for brand protection, the request containing a label, a name, a domain, or a search term for the brand.

9. The location threat monitoring system of claim 7, wherein the data from the data source is pushed to the location threat monitoring system or pulled by the location threat monitoring system on demand or on a periodic basis.

10. The location threat monitoring system of claim 7, wherein the ANN comprises a deep NN (DNN) or a recurrent neural NN (RNN).

11. The location threat monitoring system of claim 7, wherein the stored instructions are further translatable by the processor for:
preparing the data from the data source as input to the ANN; or
preparing the data from the data source as input to the location threat classifiers.

12. The location threat monitoring system of claim 7, wherein each of the location threat classifiers comprises a natural language processing (NLP) model specially trained to identify a type of location threat.

13. A computer program product for location threat monitoring, the computer program product comprising a non-transitory computer-readable medium storing instructions translatable by a processor for:

obtaining or receiving, from a data source, first data containing textual information relating to an address;

obtaining or receiving, from the data source, concurrently with the first data, second data containing textual information relating to a brand;

providing the textual information relating to the brand to a deep learning (DL) model specifically trained and tuned to analyze input data from the data source, the DL model comprising an artificial neural network (ANN), wherein the ANN is trained, through supervised learning using sample data sets from the data source, to determine a likelihood that a piece of natural language input data from the data source relates to an address or location of interest to the brand, regardless of whether the piece of natural language input data actually contains the address or location, wherein the data from the data source has no specific address or location;

determining, by a location threat monitoring system, whether the first data from the data source is to be classified for potential location threats;

determining, by the location threat monitoring system configured to detect potential threats relating to addresses or locations of interest to the brand, by comparing an outcome from the ANN with a threshold, whether the second data from the data source is to be classified for potential location threats, the outcome from the ANN comprising the probability score that the data from the data source references an address or location of interest to the brand;

responsive to the first data being classified for potential location threats, providing the first data from the data source to location threat classifiers, wherein the location threat classifiers are operable to identify location threats with respect to any address or location relating to an address or location of interest to the brand; and responsive to the probability score from the ANN meeting or exceeding the threshold, concurrently with the first data being provided to the location threat classifiers, providing the second data from the data source to the location threat classifiers, wherein the location threat classifiers are operable to identify location threats with respect to any address or location relating to an address or location of interest to the brand.

14. The computer program product of claim 13, wherein the instructions are further translatable by the processor for:
receiving, over a network from a user device, a request for brand protection, the request containing a label, a name, a domain, or a search term for the brand.

15. The computer program product of claim 13, wherein the data from the data source is pushed to the location threat monitoring system or pulled by the location threat monitoring system on demand or on a periodic basis.

16. The computer program product of claim 13, wherein the ANN comprises a deep NN (DNN) or a recurrent neural NN (RNN).

17. The computer program product of claim 13, wherein the instructions are further translatable by the processor for:
preparing the data from the data source as input to the ANN; or
preparing the data from the data source as input to the location threat classifiers.

18. The method according to claim 1, further comprising:
responsive to identifying a location threat with respect to an address or location relating to an address or location of interest to the brand, generating an alert; and
communicating the alert to a client device.

19. The location threat monitoring system of claim 7, further comprising:
    responsive to identifying a location threat with respect to an address or location relating to an address or location of interest to the brand, generating an alert; and
    communicating the alert to a client device.

20. The computer program product of claim 13, further comprising:
    responsive to identifying a location threat with respect to an address or location relating to an address or location of interest to the brand, generating an alert; and
    communicating the alert to a client device.

\* \* \* \* \*